INVENTORS
NORMAN L. CARR
VINCENT BROZOWSKI
BY

ATTORNEY

United States Patent Office 2,968,631
Patented Jan. 17, 1961

2,968,631
REGENERATION OF ISOMERIZATION CATALYSTS

Norman L. Carr, Crystal Lake, and Vincent Brozowski, Mundelein, Ill., assignors to The Pure Oil Company, Chicago, Ill., a corporation of Ohio Filed Oct. 31, 1956, Ser. No. 619,611

5 Claims. (Cl. 252—416)

This invention relates to the revivification of catalysts employed in the isomerization of aliphatic and/or alicyclic hydrocarbons. It is more specifically concerned with the regeneration of composite catalysts, such as refractory, mixed oxides composited to evince acidic properties and hydrocarbon cracking activity, having incorporated therein a hydrogenation component, these composite catalysts having become degenerated by contact with water and/or other contaminants during use as isomerization catalysts.

Although reactivity and selectivity are important attributes of a catalyst, its commercial application depends to a considerable degree on the length of its overall useful life. This useful life has two aspects, the first being the initial or virgin life, by which is meant the length of time that the newly prepared catalyst can be used before its initial activity has declined to an uneconomical level. The second aspect, with which this invention is more directly concerned, is the susceptibility of the catalyst to regeneration to restore it to an activity near its original level. The activity decline can be of a permanent nature, defined herein as deactivation, or it can be only a temporary condition, defined as degeneration. This invention is concerned with a revivification or regeneration process to restore degenerated catalysts used in the isomerization of normally liquid aliphatic and/or alicyclic hydrocarbons, or light petroleum fractions rich in these constituents, to essentially initial, high activity.

Because the normal paraffins containing 5–8 carbon atoms per molecule have a degrading effect on motor fuel octane number, it is desirable that gasoline blending stocks containing these constituents be upgraded before incorporation in motor fuel blends. One method of accomplishing this upgrading is to isomerize the normal paraffins, since their isomeric counterparts possess superior octane ratings. There has been developed for use in isomerization processes of this nature a solid catalyst comprising a hydrogenation agent-cracking catalyst composite, e.g., Ni—$SiO_2$—$Al_2O_3$, I. and E. Chem., 45 (1), 147. It has further been found that the efficiency of catalysts of this kind can be substantially improved (vide copending applications of N. L. Carr, viz., U.S. patent application Serial No. 619,376 entitled "Catalyst and Process," and U.S. patent application Serial No. 619,404 entitled "Catalyst and Process," filed October 31, 1956, now U.S. Patent Nos. 2,917,565 and 2,917,566, respectively) by preconditioning the catalyst in a certain prescribed manner, described in the aforementioned applications, prior to use. This technique, in essence, comprises incorporating a minor amount of a hydrogenation component in a refractory, mixed oxides base composited to evince acidic properties and hydrocarbon cracking activity substantially in accordance with conventional catalyst preparation techniques. The freshly prepared, "green" catalyst is activated in a reducing atmosphere in accordance with the prior art to effect reduction of the hydrogenation component of the catalyst as far as possible under specific conditions. Thereafter, the catalyst is subjected to the additional activation and conditioning treatment described in the above-mentioned applications.

In carrying out this preconditioning phase of the catalyst preparation, the composite catalyst is subjected to an oxidizing atmosphere maintained at a temperature of about 650° F. to 750° F. Following this oxidation, the oxidized catalyst is contacted with hydrogen at the same temperature as that at which the oxidation was carried out to reduce the reducible elements of the composition and produce a composite catalyst of high activity and resistance to degeneration.

Because these preconditioned catalysts are employed in the process of this invention, to facilitate the following discussion they will be referred to as "preconditioned, refractory, acidic, mixed oxides base-hydrogenation agent composite isomerization catalysts" and so designated in the appended claims.

"Preconditioned, refractory, acidic, mixed oxides base-hydrogenation agent composite isomerization catalysts" prepared in this manner have high activities and selectivities, and long active lives for commercial isomerization service. An additional feature is their receptiveness to regeneration; however, it is necessary to employ a special regeneration process if the catalysts have become degenerated by contact with water and/or other contaminating materials. Accordingly, it is the primary object of this invention to provide a regeneration process for the revivification of "preconditioned, refractory, acidic, mixed oxides base-hydrogenation agent composite isomerization catalysts" which have become degenerated by water, sulfur compounds, carbonaceous deposits, and/or other contaminants. Another object of this invention is to afford an improved procedure for revivifying degenerated "preconditioned, refractory, acidic, mixed oxides base-hydrogenation agent composite isomerization catalysts" to substantially initial, high activity. An additional object of this invention is to permit regeneration of "preconditioned, refractory, acidic, mixed oxides base-hydrogenation agent composite isomerization catalysts" which are employed in the isomerization of light, straight-run naphtha distillates, natural gasolines and other hydrocarbon mixtures consisting predominantly of $C_5$–$C_8$ saturated hydrocarbon mixtures. It is another object of this invention to provide a complete and continuous isomerization process for the treatment of saturated $C_5$–$C_8$ hydrocarbons and mixtures thereof. These and other objects and advantages will be apparent from the following detailed descritpion of this invention.

Figure 1:
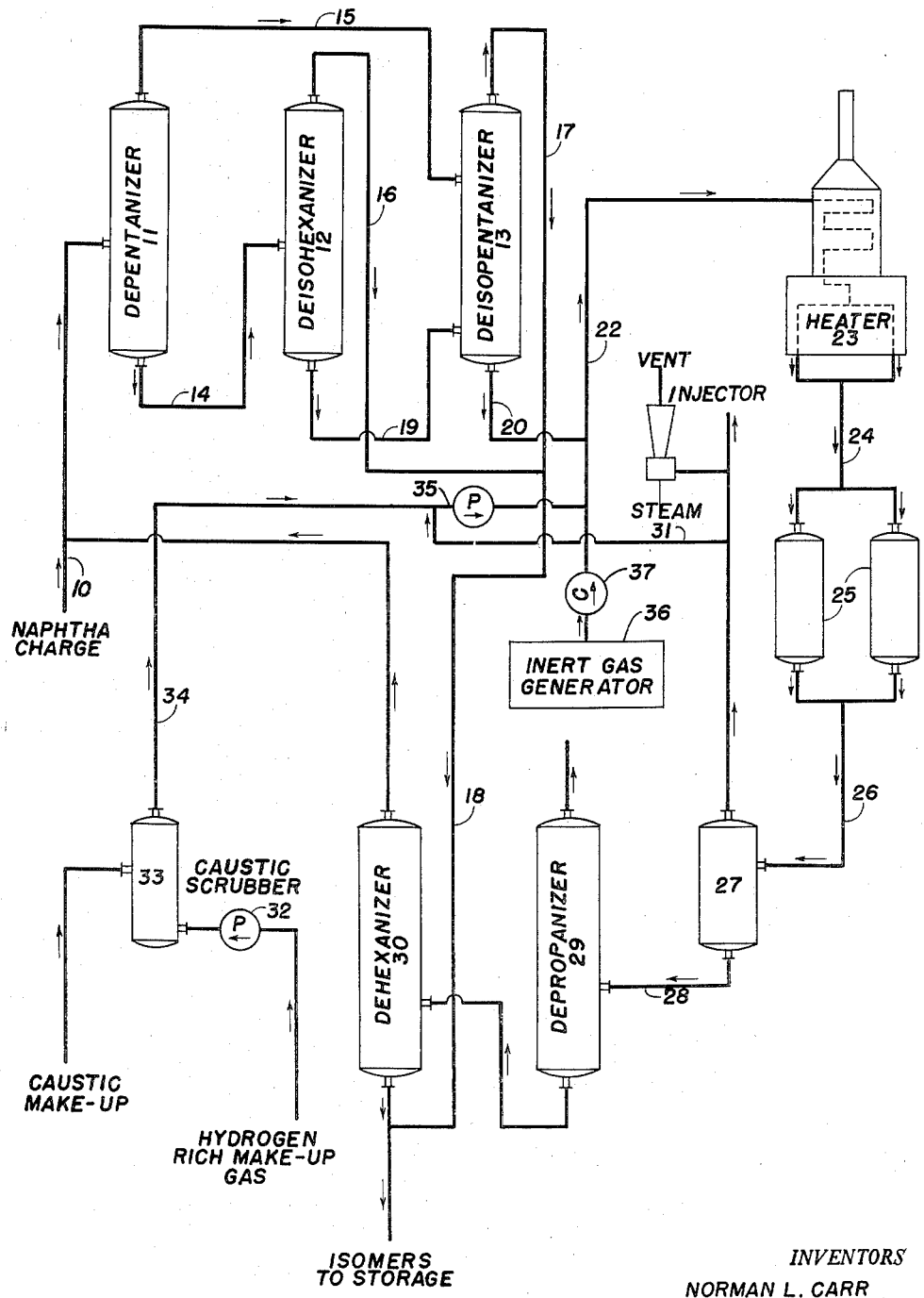
Figure 1 is a diagrammatic illustration of an isomerization process employing "preconditioned, refractory, acidic, mixed oxides base-hydrogenation agent composite isomerization catalysts."

Degeneration of "preconditioned, refractory, acidic, mixed oxides base-hydrogenation agent composite isomerization catalysts" can be caused by a number of factors. Any operation wherein water is introduced or produced under conditions conducive to its adsorption by the catalyst results in degeneration. Time, the partial pressure of the water vapor, and temperature determine the speed and extent of this "poisoning" action. Compounds and elements, such as carbon monoxide, oxygen, etc., which react to form water at the conditions of operation indirectly cause degeneration. Hydrogen sulfide is another example. This compound may even react with nickel to form sulfides. If hydrogen is present in large amounts, a nickel subsulfide may be formed. Carbonaceous deposits cause degeneration, especially if rather large amounts are deposited on the catalyst. However, with respect to the "preconditioned, refractory, acidic, mixed oxides base-hydrogenation agent composite isomerization catalysts" of this invention, this factor, while important, is difficult to evaluate because usually only a trace of coke deposition occurs even during some of the longest life tests and under some of the more severe reaction conditions.

Considering the general problem of regeneration of the degenerated, "preconditioned, refractory, acidic, mixed oxides base-hydrogenation agent composite isomerization catalysts" employed in the process of this invention, the important variables which affect the degree of regeneration can be summarized as follows: time of any treatment, temperature level of oxidation, temperature level of reduction, hydrogen purity, moisture contents of regeneration gases, rates of flow of reducing gas, hydrogen and moisture partial pressures during oxide reduction, system evacuation, etc. Some of these variables are interrelated.

It was found that in regenerating the "preconditioned, refractory, acidic, mixed oxides base-hydrogenation agent composite isomerization catalysts" certain simple oxidation and reduction procedures were ineffective, and in some cases were even deleterious, causing complete degeneration. According to this invention, it has been found that the "preconditioned, refractory, acidic, mixed oxides base-hydrogenation agent composite isomerization catalysts" which have been degenerated by contact with water, sulfur compounds, carbonaceous deposits and/or other contaminants can be regenerated to substantially virgin activity by subjecting the "preconditioned, refractory, acidic, mixed oxides base-hydrogenation agent composite isomerization catalysts," after they have become partially spent or begin to lose their effectiveness, to a regeneration process employing the following generalized procedure:

(1) *Hydrogen purge.*—At the conclusion of the reaction period, hydrogen flow is continued to remove residual hydrocarbons from the system and catalyst.

(2) *Depressuring.*—After the hydrogen purge, hydrogen flow is terminated, and pressure in the catalyst zone is reduced to atmospheric.

(3) *Evacuation (optional).*—Although this step may be omitted, it is preferable to evacuate the catalyst zone to a pressure of about 10 mm. of mercury (absolute), or less, for a sufficient time to substantially reduce the amount of absorbed water, sulfur compounds and other degenerating materials present on the catalyst.

(4) *Oxidation.*—At the conclusion of the evacuation period, or after depressuring if evacuation is omitted, the catalyst and contaminants are oxidized with oxygen (diluted), air, or other suitable gases containing free oxygen at temperatures of about 800–1000° F., with about 1000° F. being preferred. Oxidation is continued until the "combustion front" or peak temperature induced during this step passes through the catalyst bed.

(5) *Drying.*—Air, insert gas, or a mixture thereof is passed over the catalyst at a temperature of at least about 975° F. to dry the catalyst. Drying is enhanced and is more effective if carried out by subjecting the reactor to a shut-in evacuation.

(6) *Cooling.*—The catalyst is cooled to below 800° F.

(7) *Evacuation (optional).*—When the catalyst has been cooled, or while it is cooling, the reactor may be evacuated to an absolute pressure of about 10 mm. Hg or less to remove moisture from the catalyst.

(8) *Reduction.*—Hydrogen, or a free hydrogen-containing gas, is admitted to reduce the metallic oxides formed during the oxidation step. Reduction temperatures in the range of about 675–800° F. are used, with about 775° F. being preferred. Hydrogen flow is continued until substantially all of the water present has been removed from the catalyst. This state is determined by a simple qualitative analysis of the effluent.

(9) *Run preparation.*—After the catalyst has been reduced and dried, the pressure, temperature, and hydrogen flow rate are adjusted to the desired reaction levels, and feed is admitted.

Control of the water content of the catalyst during the reduction step is important. While it may be desirable to leave a trace of moisture in the catalyst for maximum activity, improved results are obtained when most of the moisture produced by the reduction reaction is removed and the catalyst contains less than about 1.3% by weight of water. This can be done by any technique that will increase the driving force to remove the water. Examples of such techniques are evacuation, nitrogen dilution, increased mass velocity, temperature manipulation, removal of impurities that form water, increased reduction period, etc.

In a preferred embodiment, regeneration of a partially spent or degenerated catalyst is carried out as follows:

(1) After shutting off the naphtha feed to the reactor, the reactor is purged with the free hydrogen-rich gas used in the process. This purge should continue until most of the naphtha vapor has been stripped from the catalyst and the reactor.

(2) The hydrogen input is stopped and the system is depressurized.

(3) The unit is "blocked-in" so that a vacuum may be applied to the reactor. A vacuum of about 10 mm. mercury, absolute, is applied for about thirty minutes.

(4) Inert gas, such as flue gas or nitrogen, is introduced to bring the system pressure up to and just above atmospheric. These four steps are carried out at about reaction (processing) temperature.

(5) Oxygen is admitted to the regeneration gas stream in a concentration below the critical level defined by the content of the oxidizable constituents of the degenerated catalyst including not only the original components of the catalyst but also foreign compositions which accumulated on the catalyst during use. In adiabatic reactors, this critical level will generally be about 0.5–1.0 volume percent of the total oxidizing gas stream, but in an isothermal reactor, straight air may be used at a controlled rate. The oxidation mechanism is exothermic. As a result, during this oxidation step there is produced a "combustion front" or peak temperature in the catalyst bed, which moves through the bed during the oxidation step. The temperature of the "front" is held just below 1000° F. If the effluent gases are recycled, moisture should be removed.

(6) After the "combustion front" passes through the bed, the unit is heated to about 975° F. in a flowing stream of air and is held at this temperature for a time sufficient for substantially complete removal of moisture and traces of carbonaceous compounds. This usually requires 1–5 hours. Evacuation at this temperature level, after complete oxidation, accelerates the drying process.

(7) The bed temperature is brought to about 750° F., but lower than 800° F. Either inert gas or air can be used during this cool-down step.

(8) The system is then purged with inert gas and evacuated to less than 10 mm. of mercury for about thirty minutes.

(9) The vacuum is "broken" with a hydrogen-containing gas and pressured to just above atmospheric. The hydrogen gas-purge should continue until only a trace of moisture is being detected in the effluent gas.

(10) The unit is then pressurized, and temperatures and hydrogen flow rates are adjusted to the desired reaction levels.

In order to illustrate the invention, several regeneration procedures where investigated and evaluated by means of standard activity and life tests. All of the tests were made at the following approximate conditions:

| | |
|---|---:|
| Average reactor temperature, °F | 660 |
| Average reactor pressure, p.s.i.g. | 350 |
| Hydrogen rate, s.c.f./bbl. of liquid feed | 2000–3000 |
| Length of process period, hrs. (activity test only) | 0.5–1.0 |
| Liquid volume hourly space velocity | 1.0 |

Results of the non-limiting examples were as follows:

EXAMPLE I

A silica-alumina-hydrogenation-component composite isomerization catalyst was prepared by impregnating a nominal 75/25 silica-alumina support having the following specific composition:

| | Weight percent |
|---|---|
| $Al_2O_3$ | 24.4 |
| $Na_2O$ | 0.021 |
| $SO_4$ | 0.25 |
| Fe | 0.025 |
| $SiO_2$ | 75.3 |

The support was impregnated with 5% w. nickel by a standard catalyst preparation method, and the "green" catalyst was then subjected to the following activation procedure:

About 200 ml. of the freshly prepared catalyst was placed in a reactor 20" long and 1" in diameter, contained in an electric furnace, and was heated to 975° F. at a linear rate of temperature increase over a five-hour period. Hydrogen gas was passed through the catalyst mass at a rate of 20 s.c.f.h. pound of catalyst. The temperature and hydrogen flow were maintained for about twenty-five hours. To precondition the activated catalyst to enhance its activity, selectivity, and life, the catalyst was oxidized at 650° F., evacuated for ten minutes, and hydrogen-purged at 660° F. to effect reduction (vide copending applications, cited supra).

Run I-A

After being subjected to several activity tests and regeneration procedures, the catalyst (having an activity rating of about 70) was subjected to an extended life test. The hydrocarbon feed stock used in this test had the following characteristics:

| | |
|---|---|
| ASTM boiling range °F | 90–195 |
| Gravity, ° API | 77.0 |
| Hydrocarbon type analysis, percent v.: | |
| Paraffins | 84 |
| Naphthenes | 14 |
| Aromatics | 2 |
| Sulfur, percent w | 0.013 |
| Res. octane number (CRC F–1–545) | 65.3 |
| Res. octane number with 3 cc. T.E.L. | 87.2 |

The following results were obtained:

| Cut No. | LVHSV (v./hr./v.) | Reactor Temp. (° F.) | Reactor Pressure (p.s.i.g.) | Time (hrs.) | Res. Octane No. (clear) |
|---|---|---|---|---|---|
| 2 | 1.13 | 659 | 350 | 3 | 72.2 |
| 8 | 1.01 | 659 | 350 | 15 | 70.7 |
| 13 | 1.90 | 676 | 350 | 24 | 68.0 |

The rapid decline in activity, as indicated by the decreasing octane number of the product was attributed to the high sulfur content of the feed stock.

Run II-A

The life test was terminated and an attempt was made to regenerate the catalyst by passing one part of air to ten parts of nitrogen over the catalyst at reaction temperature, i.e., 650° F., until the hot zone passed from top to bottom through the catalyst bed, followed by straight air until no hot zone or temperature rise was noted. The catalyst was then reduced in a stream of hydrogen-rich gas flowing at a rate of 5 s.c.f.h. for 15 minutes.

Another test was then conducted, using a naphtha feed stock of low sulfur content having the following characteristics:

| | |
|---|---|
| ASTM boiling range °F | 90–195 |
| Gravity, ° API | 77.0 |
| Sulfur, percent w | 0.004 |
| Research octane No., clear | 66 |
| Research octane No. with 3 cc. T.E.L. | 86 |

The following results were observed:

| Cut No. | LVHSV (v./hr./v.) | Reactor Temp. (° F.) | Reactor Pressure (p.s.i.g.) | Time (hrs.) | Res. Octane No. (clear) |
|---|---|---|---|---|---|
| 1 | 1.16 | 684 | 350 | 2½ | 74.4 |
| 2 | 1.27 | 680 | 350 | 3¾ | 72.8 |

The low octane number enhancement indicated that the catalyst had been "poisoned" in the first life test and had not been completely revivified by the attempted regeneration.

Run III-A

It was therefore subjected to another regeneration procedure, as follows:

(1) The catalyst was purged with nitrogen at a reactor temperature of about 680° F. to free the catalyst and reactor of naphtha vapors.

(2) It was oxidized at 650° F. (furnace temperature) by a flowing stream of air, at a rate and in such a way that the catalyst temperature did not exceed 850° F., until temperature rise had disappeared.

(3) A vacuum of about 10 mm. of mercury was applied for 10 minutes.

(4) Hydrogen was admitted to break the vacuum and raise the reactor pressure to 350 p.s.i.g.

An activity test was then run employing the hereinbefore-described operating conditions and using the following naphtha feed stock:

| Component: | | |
|---|---|---|
| n-Pentane | vol. percent | 27.9 |
| n-Hexane | do | 26.5 |
| n-Heptane | do | 25.6 |
| Cyclohexane | do | 20.0 |
| | | 100.0 |
| Gravity, ° API | | 75.0–75.9 |
| Specific gravity | | 0.6852–0.6823 |
| R.I., $N_d^{20}$ | | 1.3840–1.3830 |
| Research octane number, clear | | 45.0–48.0 |

This feed stock was used throughout the remainder of the tests. The activity rating during this test was only 57.5, which was 12 units below that of the catalyst when fresh. Activity rating is defined as the research octane number of the liquid product obtained from the isomerization process with the reactor at a temperature of 660° F., pressure of 350 p.s.i.g., LVHSV of 1.0, and $H_2$/hydrocarbon mole ratio of 3.5. Therefore, this regeneration procedure was also inadequate.

Run IV-A

The catalyst was again subjected to this regeneration procedure, and the activity rating remained low, at 60. The purpose of this run was to verify the results obtained in Run III-A. Also, it showed that successive regeneration operations using the prescribed steps of oxidation, evacuation and reduction were inadequate.

Run V-A

After Run IV-A, the catalyst was subjected to the regeneration method of this invention, in which the following steps were carried out:

(1) The catalyst was thoroughly purged with hydrogen-rich gas, and was then purged with nitrogen to remove the naphtha vapors from the catalyst and reactor.

(2) An oxidation step was carried out at about 800° F. by passing an air-nitrogen mixture, and then straight air, over the catalyst for one hour.

(3) The catalyst was cooled to 630° F. while being purged with nitrogen.

(4) Hydrogen-rich gas was passed over the catalyst at about 1 s.c.f.h. for 12 hours at 630° F. to effect complete reduction and drying.

An activity test was then run and it was found that the activity rating had been increased to 68 by the method of this invention. The product octane number was substantially that achieved by the catalyst when fresh. A slightly lower activity was attributable to minor variations from the preferred ranges of temperatures and times of treatment.

EXAMPLE II

Another catalyst was prepared by impregnating a silica-alumina support with nickel and platinum in a conventional manner. The silica-alumina support had the following composition:

| Component: | Wt. percent |
|---|---|
| $Al_2O_3$ | 13.2 |
| $Na_2O$ | 0.017 |
| $SO_4$ | 0.2 |
| Fe | 0.025 |
| $SiO_2$ | 86.6 |

The final catalyst composition had a nickel content of 5% by weight and a platinum content of 0.02% by weight, and was formed into ⅛" x ⅛" cylindrical pellets. After pelleting, it was activated by heating to 975° F. over a five-hour period in a stream of hydrogen flowing at a rate of 20 s.c.f.h./pound of catalyst. Temperature and hydrogen flow were then maintained for about 25 hours.

Run I–B

The activated catalyst was preconditioned by the following procedure:

(1) Oxidized with air at 650–725° F.

(2) Purged with nitrogen and evacuated to 10 mm. Hg for 30 minutes.

(3) Vacuum broken and pressure raised to 350 p.s.i.g. with hydrogen at 680° F.

Activity tests on the preconditioned catalyst showed an activity rating of about 75.0.

Run II–B

The catalyst from Run I–B was again conditioned by a procedure similar to that used in Run I–B, except that the evacuation step was omitted. The activity rating was again 75.

Run III–B

The catalyst of Run II–B was then subjected to a life test using the feed stock of Run I–A, Example I. The catalyst was heated to about 675° F. with nitrogen flowing through the reactor, and was then reduced in a stream of hydrogen, before starting the test. Results were as follows:

| Cut No. | LVHSV (v./hr./v.) | Reactor Temp. (° F.) | Reactor Press. (p.s.i.g.) | Time (hrs.) | Gravity (° API) | Res. Oct. No. (clear) |
|---|---|---|---|---|---|---|
| 2 | 0.99 | 657 | 350 | 5 | 80.4 | 72.4 |
| 3 | 0.99 | 661 | 350 | 7 | 82.1 | 78.2 |
| 12 | 0.98 | 669 | 350 | 25 | 79.3 | 71.2 |

Run IV–B

An attempt was made to regenerate the degenerated catalyst from Run III–B by evacuating to 10 mm. Hg for one hour at process temperature, and another test run was made. The product octane number was only 70.8, indicating that this attempted revivification was unsuccessful.

Run V–B

The degenerated catalyst from Run IV–B was then regenerated according to the method of this invention by subjecting it to the following procedural steps:

(1) Heated to 900° F. in a nitrogen stream. No water was present in the effluent gas stream.

(2) Oxidized at bed temperatures of 880–890° F., with maximum oxidation temperatures of 975–1000° F., by introducing an air-nitrogen mixture consisting of 1 part of air and 12 parts of nitrogen. Air rates were gradually increased, and oxidation was complete in about fifty minutes. Water evolution was evident during oxidation, but had ceased by the time the step was concluded.

(3) Cooled to 800° F. with a flow of nitrogen.

(4) Reduced with flowing hydrogen, during which time water was evolved.

(5) Adjusted temperatures, pressure, hydrogen flow and other variables to run conditions.

Operating conditions and results obtained in an activity test that was then run were as follows:

| | |
|---|---|
| LVHSV, v./hr./v. | 1.0 |
| $H_2$ rate, s.c.f.h. | 4.6 |
| Average reactor temp., ° F. | 652 |
| Process period, hr. | 1.0 |
| Liquid recovery, percent | 94.9 |
| Res. octane No., clear | 72.8 |
| Gravity, ° API | 79.7 |
| Refractive index | 1.3759 |
| Activity rating | 75.0 |

The catalyst had been rejuvenated to virgin activity by the method of this invention.

Accordingly, to effect the objectives of this invention, it has been found that the oxidation step must be at temperatures greater than 800° F. in order to achieve the revivification of a catalyst that has been subjected to contamination by water, sulfur compounds, or other contaminants. In Runs II–A, III–A and IV–A of Example I, the catalyst that had been degenerated by sulfur compounds was not regenerated when subjected to oxidizing temperatures of about 650° F., while in Run V–A of Example I the same catalyst was regenerated by raising the oxidation temperature above 800° F. In Run IV–B of Example II, it was impossible to regenerate a degenerated catalyst when the oxidation step was omitted, and oxidation is therefore necessary.

It is also essential that the catalyst be freed of all but trace amounts of water after the reduction step to achieve maximum reactivation. This is shown by Run V–A of Example I wherein hydrogen flow was continued for a long period of time after reduction had been completed. Steps 3 and 7 of the generalized method hereinbefore presented may be employed to reduce the moisture content of the catalyst and thereby shorten the post-reduction drying step.

It has also been found that reduction should be carried out at temperatures below about 800° F., with about 750° F. being preferred, in order to achieve substantially the original high activity. The foregoing regeneration technique is especially adaptable in the revivifying of a "preconditioned, refractory, acidic, mixed oxides base-hydrogenation agent composite catalyst" employed in the isomerization of low-sulfur-containing feed stocks. To avoid difficulties in effecting the regeneration, it is important that the isomerization feed stocks be pretreated in conventional desulfurization processes to reduce the total sulfur content of the feed to less than about 0.003% by weight. In the event that feed stocks of higher sulfur content are used, it may be necessary to employ more rigorous regeneration procedures to revivify the catalyst to initial (virgin) activity.

This is illustrated by the following example, in which a nickel (2.7%)-molybdena (4.4%)-silica-alumina composite catalyst employed in the isomerization of a high sulfur feed stock was regenerated. After prolonged use this catalyst had not been responding completely to the hereinbefore-described, single-cycle regeneration technique. Also, processing cycles were becoming shorter due to lower initial activity and less resistance to degeneration. Two separate regenerations employing the process of this invention were not effective in reviving the catalyst to its initial activity. The catalyst had an activity rating of only 59 (48 is zero activity and 66 to 68 is equivalent to initial (virgin) catalyst activity). During these two treatments, a considerable quantity of sulfur compounds was removed from the catalyst, as evidenced by the evolution of sulfur dioxide. A sequence of three cycles of oxidation and reduction at about 975°–1025° F. were carried out. This cycling of oxygen and hydrogen atmospheres is a very effective method of removing sulfur deposits and/or sulfur compounds from a catalyst bed. One exposure of either atmosphere for a long time does not remove nearly as much sulfur (or regenerate the catalyst) as do several short cycles of alternating atmospheres. After this technique was used, the activity rating was 67.4, or equivalent to origin activity after some 3,000 hours of service.

The following details describe the cycling-atmosphere regeneration employed:

The isomerization processing cycle was terminated when the low activity rating of the catalyst decreased to 59. This included stopping naphtha flow, a hydrogen purge, depressuring, evacuation, and introducing a nitrogen atmosphere. The degenerated catalyst was oxidized with air-nitrogen mixture with the reactor at about 660° F., such that peak burning temperatures were held below about 850° F. After one hour the catalyst oxidation was complete, and the entire system was heated to about 975° F. Air was used at about two s.c.f.h. $SO_2$ was first evolved when the temperature reached about 900° F. Air treatment was continued for about 30 minutes until $SO_2$ was not detected in off-gas. The temperature was held at about 975° F. The system was evacuated with no gas inflow. Immediately thereafter, vacuum was relieved with hydrogen at about 4 s.c.f.h., temperature 975° F. Flow was continued for about 25 minutes. The system was evacuated again; however, vacuum was relieved by repressuring with nitrogen instead of hydrogen. Air was added at a controlled rate such that the temperature in the bed was below 1050° F. No $SO_2$ was detected until the oxygen reached a bed depth of 10–12"; at this point, large amounts of $SO_2$ were present in the off-gas. Air flow was continued for about 25 minutes through the reactor until there was only a trace of $SO_2$ in the off-gas. The system was evacuated again and hydrogen was added to bring the pressure up to about atmospheric. The hydrogen purge was continued for 15 minutes. The system was again evacuated, and nitrogen was added to relieve vacuum. Air and nitrogen were added for oxidation, as before. $SO_2$ was evolved when oxygen reached the bed depth of 13–16". Large amounts of $SO_2$ were evolved and continued to flow from the system for about one hour. The system was evacuated with no inflow; then hydrogen was added to break vacuum. Hydrogen purge was continued. Thereafter, the system was evacuated with no inflow, after which the catalyst was oxidized as before. $SO_2$ was evolved when oxygen reached the bed depth of 16–19". Air flow was continued for about one hour until only a trace of $SO_2$ was present in off-gas. The evacuation of the system, with no inflow, was again effected and nitrogen added to repressure the system. The system was cooled to 700° F. with catalyst in oxidized form in the presence of nitrogen. When the temperature reached about 700° F., hydrogen was added for reduction purposes and to "condition" the catalyst. The hydrogen rate was about 5 s.c.f.h. and this rate was continued until no moisture could be detected in the off-gas stream.

After this regeneration, an activity run was made. The resulting activity was that of the same catalyst when near virgin condition. The activity rating was 67.4. It is therefore seen that in regenerating "preconditioned, refractory, acidic, mixed oxides base-hydrogenation agent composite catalyst" in the isomerization of high sulfur feed stocks a series of oxidation-reduction steps carried out in accordance with the process of this invention must be employed. During the oxidation steps the oxidizing gas is passed through the system until the effluent is substantially free from $SO_2$. This will require a plurality of oxidation-reduction cycles, which will depend upon the severity of the degeneration. Generally, 3–8 cycles will be sufficient, however, in more extreme situations additional cycles may be necessary.

Catalysts which may be regenerated employing the process of this invention are those which comprise a refractory, mixed oxides base composited to evince acidic properties and hydrocarbon cracking activity, having incorporated therein 2 to 10% of a hydrogenation component, such as group VIII metals; oxides of polyvalent metals of groups V, VI and VII; and group VIII metal salts of oxyacids of polyvalent metals of groups V, VI, and VII. Specific examples of these hydrogenation components include cobalt, nickel, and platinum; tungsten oxide, molybdenum oxide, chromium oxide, manganese oxide, vanadium oxide; and cobalt, nickel, and platinum salts of the oxyacids of tungsten, molybdenum, chromium, vanadium, and manganese, e.g., nickel tungstate, cobalt molybdate, nickel molybdate, etc. Suitable refractory, acidic, mixed oxide bases include but are not limited to $SiO_2$—$Al_2O_3$, $SiO_2$—$ZrO_2$, $SiO_2$—$TiO_2$, $SiO_2$—$B_2O_3$, $Al_2O_3$—$ZrO_2$, $Al_2O_3$—$BeO$, $Al_2O_3$—$B_2O_3$, $SiO_2$—$CrO$, $B_2O_3$—$TiO_2$, $SiO_2$—$Al_2O_3$—$ZrO_2$, $SiO_2$—$Al_2O_3$—$BeO$, and acid-treated clays. These mixed oxides, in forming the base, can be either in chemical or physical combination. From a standpoint of activity, it has been found that catalyst carriers containing 50 to 87% silica and 50 to 13% alumina, having incorporated therein 3 to 5% of the hydrogenation agent, are preferred.

The regeneration process of this invention is especially adaptable as a complementary manipulative technique which can be employed in the isomerization of normal $C_5$–$C_8$ hydrocarbon mixtures such as light naphtha distillates or natural gasolines in the presence of the "preconditioned, refractory, acidic, mixed oxides base-hydrogenation agent composite catalysts" described in the above-mentioned copending applications. In an isomerization process of this nature the following reaction conditions are employed:

|  | Range | Range Preferred |
|---|---|---|
| Temperature, ° F. | 600–750 | 650–700 |
| Pressure, p.s.i.g. | 50–1,000 | 300–500 |
| Mole Ratio, hydrogen/hydrocarbon | 0.5–6.0 | 2–4 |
| Liquid Hourly Space Velocity (LVHSV) | 0.1–2.0 | 0.5–1.2 |

Figure 1 illustrates an arrangement of unit processes providing an integrated isomerization unit. In this flow diagram, for simplicity, pumps, heat exchangers, valves, by-passes, and other auxiliaries are not shown. The proper placement of these will at once be evident to those skilled in the art. Low sulphur naphtha from a storage source, not shown, together with the n-pentane and n-hexane fractions of the reaction effluent separated in the product recovery system, is fed through line 10 into the feed preparation system comprising depentanizer 11, deisohexanizer 12, and deisopentanizer 13.

The depentanizer column has 35 plates and operates at an external reflux ratio of 3.7 to 1 on net overhead. A recovery of 97% of the pentanes in the overhead, and 92% of the isohexane in the bottoms is obtained. The bottoms from the depentanizer are sent through line 14 to the deisohexanizer, which has 48 trays and operates at an external reflux ratio of 2.8 to 1 on net overhead. A recovery of 91% of the isohexane in the overhead and 90% of the normal hexane in the bottoms is obtained.

The overhead from the depentanizer is charged by means of line 15 to the deisopentanizer. This column has 55 trays, operates at an external reflux ratio of 7.4 to 1 on net overhead, and is capable of recovering 89% of the isopentane in the overhead and 95% of the normal pentanes in the bottoms.

The overhead products from the deisopentanizer and deisohexanizer, flowing through lines 16 and 17, respectively, are high in isoparaffin content (94% and 92%, respectively) and are combined in line 18 to form a portion of the finished isomerate.

The bottoms from the deisopentanizer and deisohexanizer, the latter being fed into the deisopentanizer through line 19, contain the normal pentane, the normal hexane and the entire heptane fraction of the fresh feed, together with the normal pentane and normal hexane recycle. The bottoms from these two towers comprise the liquid feed to the reactor; the reactor feed for the particular feed composition and prefractionating conditions chosen is 93% of the fresh feed volume. The reactor feed in line 20 is combined with hydrogen-rich recycle gas from line 35 in the mount of 3000 s.c.f./bbl., and the combined streams in line 22 are heated in fired heater 23 to the reaction conditions of 650°–700° F. and 350 p.s.i.g. The stream then passes through line 24 to down-flow reactor 25 at a liquid hourly space velocity of about 1.0. The reactor effluent in line 26 is cooled and separated in high pressure separator 27 into a recycle gas stream and an unstabilized liquid. The latter is fed by means of line 28 to the product recovery system comprising depropanizer 29 and dehexanizer 30. The hydrogen-rich recycle gas stream is returned to the system by means of line 31.

To maintain system pressure, a stream of hydrogen-rich gas from a catalytic reformer or other source is introduced into the suction of recycle gas compressor 32. This gas is caustic-scrubbed for the removal of hydrogen sulfide, if necessary, in scrubber 33 and admixed with the recycle gas stream in line 31 by means of line 34.

The unstabilized liquid is charged to depropanizer 29 to remove propane and lighter materials, the principal source of which is the make-up gas stream to the recycle gas compressor suction. The stabilizer bottoms are sent to the dehexanizer, where the pentanes and hexanes are taken overhead for return to the feed preparation section. It is often desirable to separate the mixed heptanes present in the dehexanizer bottoms, so that the normal heptane can be recycled. The dehexanizer bottoms are sent to product storage. In this arrangement for the catalytic isomerization of a light, straight-run gasoline, almost complete recycling of the normal pentane and normal hexane components of the reactor effluent is effected so that they are ultimately converted into isoparaffins. It is usually advantageous to add a heptane tower to separate the n- and iso-heptanes so that the normal heptane fraction can also be recycled to the reactor, as will hereinafter be discussed.

To carry out the regeneration procedure, it is necessary to have an inert gas generator 36 and compressor 37. All regeneration gases must be bone-dry, and the hydrogen-rich gas also must be essentially free of oxygen and carbon monoxide.

In employing this isomerization process, a light, straight-run gasoline having the following characteristics:

FEED STOCK ANALYSES AND CHARACTERISTICS

| Component: | Wt. percent |
|---|---|
| $nC_4$ | 0.3 |
| $iC_5$ | 10.4 |
| $nC_5$ | 12.6 |
| 2,2-dimethylbutane | 1.1 |
| Cyclopentane | 1.2 |
| 2-methylpentane | 11.3 |
| 2,3-dimethylbutane | 11.3 |
| 3-methylpentane | 6.4 |
| $nC_6$ | 13.8 |
| Methylcyclopentane | 6.7 |
| 2,2-dimethylpentane | 0.8 |
| 2,4-dimethylpentane | 0.9 |
| Benzene | 0.3 |
| 2,3-dimethylpentane | 2.1 |
| 2,2,3-trimethylpentane | 2.1 |
| Cyclohexane | 3.9 |
| 3,3-dimethylpentane | 0.6 |
| 2-methylhexane | 3.9 |
| 3-methylhexane | 3.0 |
| Dimethylcyclopentanes | 2.4 |
| 2,2,4-trimethylpentane | 0.3 |
| $nC_7$ | 10.9 |
| Unknown | 1.2 |
| Methylcyclohexane | 2.2 |
| Unknown | 3.7 |
| | 100.0 |

| | |
|---|---|
| R.O.N., clear | 64.4 |
| R.O.N., 3 cc. T.E.L. | 85.5 |
| ° API gravity | 75.7 |
| ASTM boiling range °F. | 90–195 |
| Sulfur, wt. percent | 0.0015 | was processed in the presence of a preconditioned isomerization catalyst consisting of 10% $NiMoO_4$ supported on a 75/25 silica-alumina carrier. The reaction conditions were as follows:

Temp. -------- 655°–680° F. (Temperature gradually increased over the range in order to hold the octane number of the product constant.)
LVHSV ------- 1.0.
$H_2$/HC ------- 2.5 to 3.0.
Pressure ------ 350 p.s.i.g.

In processing 4000 barrels per stream day, a yield of 96% isomerate is obtained. This isomerate, containing 3 cc. of T.E.L., has a Research Octane No. of 97.

When the catalyst activity declines and an isomerate having an equivalent activity rating of about 63 is being produced, the regeneration is carried out. The processing phase is stopped and the catalyst regeneration is commenced by first discontinuing the oil feed. The flow of recycle hydrogen is continued to remove naphtha vapors from the reactor system. After the reactor system is purged, the hydrogen flow is stopped. The reactor system is evacuated to a pressure of 10 mm. Hg and retained in this state for about 30 minutes. The system is then repressured with flue gas, which is circulated through the system at a pressure of about 100 p.s.i.g. and a heater outlet temperature of 700° F. Air is added in controlled volumes to stay under a peak catalyst temperature of about 975° F. When combustion is complete, the flow of air through the system is maintained for about 1–5 hours. The bed temperature is adjusted to about 750° F. and the reactor system is purged with flue gas. The system is again evacuated to a pressure of 10 mm. Hg and retained at this pressure for about 30 minutes. Hydrogen-rich gas is introduced to repressure the system to just above atmospheric. The temperature of the catalyst during this operation is about 700° to 750° F. (preferably about 750° F.). The low-pressure gas purge with hydrogen is continued until no significant quantity of moisture is evolved from the reactor, after which the system is pressurized to operating pressure with the hydrogen-rich gas. On-stream conditions are established by adjusting the reactor temperature to just below that of normal operation, establishing the proper hydrogen-rich gas rate (circulation) and initiating the naphtha flow.

Figure 2:
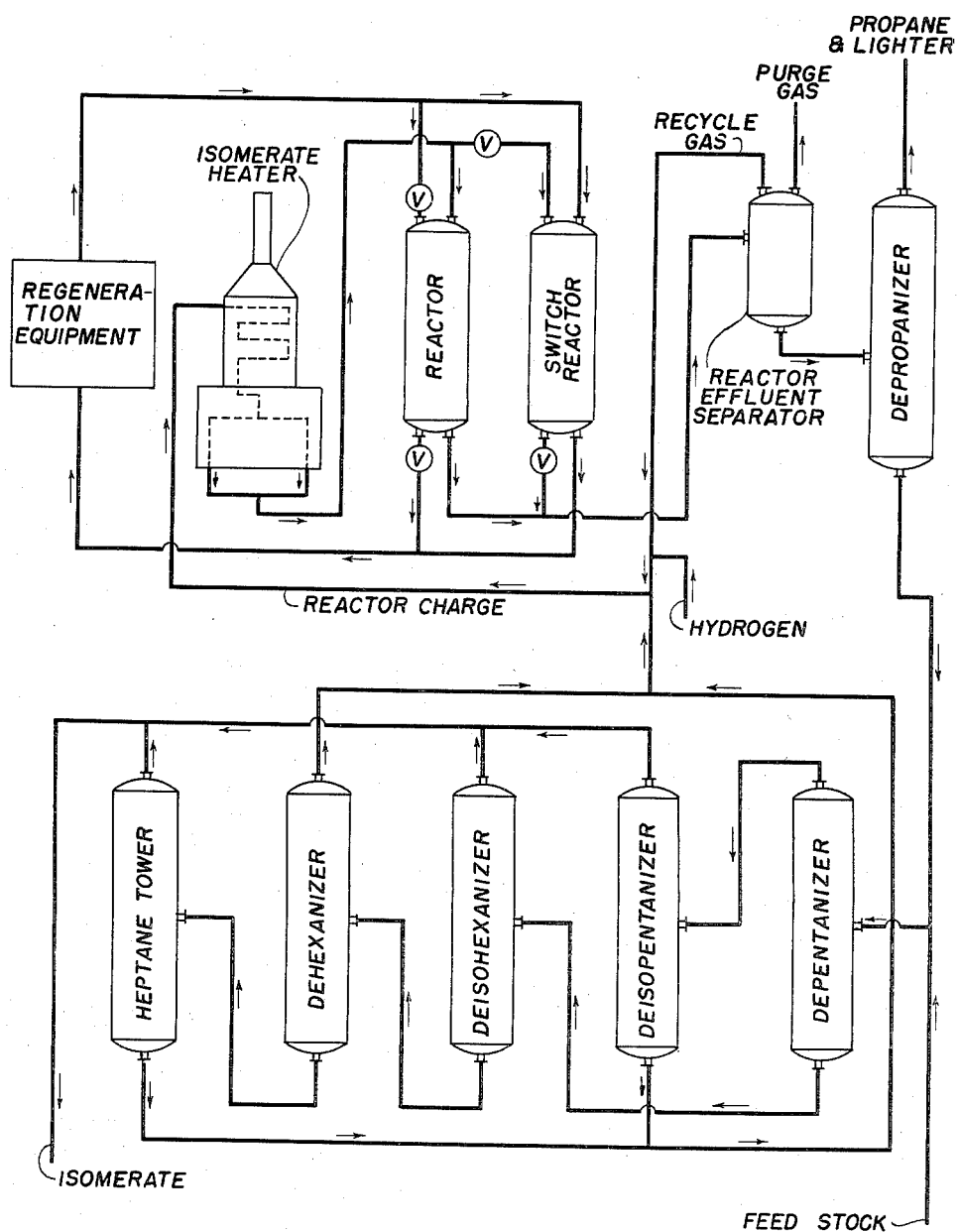
Figure 2 is a flow diagram of an isomerization process of this invention in which provisions are made for the separate processing of heptane hydrocarbons.

It is to be noted that the process of this invention not only effects the isomerization of normal pentanes and hexanes, but advantageously isomerizes normal heptane, a compound having a rating of zero octane number. Because of this feature, it usually is desirable to include a deisoheptanizer tower in the product recovery system. In this instance, the bottoms from the dehexanizer are passed to a deheptanizer instead of being directly admixed with the product. This operating scheme is illustrated schematically in Figure 2. A processing scheme of this type is also advantageously employed in the treatment of feed stocks containing appreciable amounts of saturated, alicyclic hydrocarbons. The "preconditioned, refractory, acidic, mixed oxides base-hydrogenation agent composite isomerization catalyst" effectively isomerizes the naphthenic constituents and the recovery system permits the removal of naphthenes which would otherwise build up excessively in the reactor feed.

Accordingly, it is seen that the process of this invention involves an isomerization technique employing a rugged, economical, regenerable catalyst to convert not only straight-chain pentanes and hexanes, but also normal heptane, to high-octane-number, branched-chain isomers. It is evident that certain modifications of the process and regeneration phases of this invention will be evident to those skilled in the prior art. Although the foregoing invention is specifically illustrated there are modifications in the various phases of this invention which will be obvious to those skilled in the art. It is well to note in this regard that in the initial preparation of the catalyst as well as the regeneration process of this invention, in the preconditioning phase it is preferred that successive steps of oxidation and reduction not be carried out without employing an intermediate purge step to avoid the deleterious effect on the catalyst due to the presence of water vapor or the possibility of forming explosive mixtures of oxygen and hydrogen. This purging, which can be carried out by using an inert gas, evacuation of the process vessel, or both ordinarily is conventional practice which does not influence the characteristics of the catalyst or the effectiveness of the regeneration process. Therefore, this invention is limited only by the appended claim structure in which is claimed:

1. A process for regenerating a catalyst consisting essentially of a silica-alumina hydrocarbon cracking catalyst support containing 2 to 8% w. of nickel which has been activated by sequential reduction at an elevated temperature, oxidation at 650°–850° F., and reduction with substantially pure hydrogen at 650°–850° F. for a time sufficient to substantially completely reduce the hydrogenating agent thereon, said catalyst being used in the reduced, activated form in the isomerization of isomerizable n-paraffins at temperatures of 600°–750° F., in admixture with hydrogen at a pressure of 50–1000 p.s.i. until the catalyst has become degenerated from extended use; said regenerating process comprising purging the reaction zone containing said catalyst in the reduced, degenerated form with an inert gas, free of $H_2O$, CO, and $H_2S$, at about 600°–700° F. and 0–15 p.s.i.g. to strip the reaction zone substantially free of isomerization reactants and reaction effluent, reducing the pressure in the reaction zone to atmospheric pressure while maintaining said temperature, contacting said catalyst with an oxygen-containing gas at a temperature of about 800°–1000° F. until all oxidizable constituents of the catalyst are substantially completely oxidized, purging said catalyst with a dry inert gas at a temperature of 975°–1050° F. until the catalyst is dehydrated, and thereafter reducing the oxidized catalyst with a hydrogen-containing gas at a temperature of 700°–775° F. until all reducible catalyst constituents are substantially completely reduced and all by-product water is removed.

2. A process in accordance with claim 1 in which said purging is carried out employing a hydrogen-containing gas free of $H_2O$, CO, and $H_2S$, at about 600°–700° F. and 0 to 15 p.s.i.g. pressure.

3. A process for regenerating a catalyst consisting essentially of a silica-alumina hydrocarbon cracking catalyst support containing 2 to 8% w. of nickel which has been activated by sequential reduction at an elevated temperature, oxidation at 650°–850° F., and reduction with substantially pure hydrogen at 650°–850° F. for a time sufficient to substantially completely reduce the hydrogenating agent thereon, said catalyst being used in the reduced, activated form in the isomerization of isomerizable n-paraffins at temperatures of 600°–750° F., in admixture with hydrogen at a pressure of 50–1000 p.s.i. until the catalyst has become degenerated from extended use; said regenerating process comprising purging the reaction zone containing said catalyst in the reduced, degenerated form with an inert gas, free of $H_2O$, CO, and $H_2S$, at about 600°–700° F. and 0–15 p.s.i.g. to strip the reaction zone substantially free of isomerization reactants and reaction effluent, reducing the pressure in the reaction zone to subatmospheric pressure while maintaining said temperature for a time sufficient to remove occluded gases from the catalyst, contacting said catalyst with an oxygen-containing gas at atmospheric pressure and a temperature of about 800°–1000° F. until all oxidizable constituents of the catalyst are substantially completely oxidized, purging said catalyst with a dry inert gas at a temperature of 975°–1050° F. until the catalyst is dehydrated, and thereafter reducing the oxidized catalyst with a hydrogen-containing gas at a temperature of 700°–775° F. until all reducible catalyst constituents are substantially completely reduced and all by-product water is removed.

4. A process in accordance with claim 3 in which the dry inert purging gas used to dehydrate the catalyst is the oxygen-containing gas used to oxidize the degenerated catalyst.

5. A process in accordance with claim 3 in which said subatmospheric pressure is not more than about 10 mm. Hg.

References Cited in the file of this patent

UNITED STATES PATENTS

| | | |
|---|---|---|
| 2,226,548 | Burk | Dec. 31, 1940 |
| 2,406,117 | Welty | Aug. 20, 1946 |
| 2,409,690 | Nicholson et al. | Oct. 26, 1946 |
| 2,651,597 | Corner et al. | Sept. 8, 1953 |
| 2,718,535 | McKinley et al. | Sept. 20, 1955 |
| 2,749,287 | Kirshenbaum | June 5, 1956 |
| 2,870,085 | Love | Jan. 20, 1959 |